United States Patent
Canepa et al.

(10) Patent No.: US 11,995,840 B2
(45) Date of Patent: May 28, 2024

(54) ANTHROPOMETRIC DATA PORTABLE ACQUISITION DEVICE AND METHOD OF COLLECTING ANTHROPOMETRIC DATA

(71) Applicant: I-DEAL S.R.L., Biella (IT)

(72) Inventors: Eugenio Alessandro Canepa, Gaglianico (IT); Stefano Fasana, Sandigliano (IT)

(73) Assignee: I-DEAL S.R.L., Biella (IT)

( * ) Notice: Subject to any disclaimer, the term of this patent is extended or adjusted under 35 U.S.C. 154(b) by 391 days.

(21) Appl. No.: 17/419,626

(22) PCT Filed: Dec. 31, 2018

(86) PCT No.: PCT/IT2018/000174
§ 371 (c)(1),
(2) Date: Jun. 29, 2021

(87) PCT Pub. No.: WO2020/141565
PCT Pub. Date: Jul. 9, 2020

(65) Prior Publication Data
US 2022/0084208 A1    Mar. 17, 2022

(51) Int. Cl.
*G06T 7/12* (2017.01)
*G06T 7/00* (2017.01)

(52) U.S. Cl.
CPC .............. *G06T 7/12* (2017.01); *G06T 7/0012* (2013.01); *G06T 7/97* (2017.01); *G06T 2207/30196* (2013.01)

(58) Field of Classification Search
CPC ........... G06T 7/12; G06T 7/0012; G06T 7/97; G06T 2207/30196
See application file for complete search history.

(56) References Cited

U.S. PATENT DOCUMENTS

| | | | | |
|---|---|---|---|---|
| 2008/0212742 A1* | 9/2008 | Hughes | ................... | G01T 1/167 378/98.12 |
| 2010/0111370 A1* | 5/2010 | Black | .................. | G06F 18/2321 705/26.1 |
| 2011/0058708 A1* | 3/2011 | Ikenoue | ................... | G06T 7/251 382/103 |
| 2011/0135165 A1* | 6/2011 | Wechsler | .............. | G06F 18/211 382/118 |

(Continued)

FOREIGN PATENT DOCUMENTS

| | | |
|---|---|---|
| CN | 102005029 A | 4/2011 |
| CN | 10263731 | 8/2012 |

(Continued)

OTHER PUBLICATIONS

Office Action dated Jul. 28, 2023 in CN 2018801005738.
(Continued)

*Primary Examiner* — Md K Talukder
(74) *Attorney, Agent, or Firm* — Aldo Noto; RIMON PC

(57) ABSTRACT

An anthropometric data portable acquisition device includes an image sensor and a processing unit. The processing unit in turn includes: an acquisition module, configured to receive first images of a person from the image sensor; an anonymised image processor, configured to provide second images from respective first images by applying the edge detection procedure; a communication module, configured to send out the second images.

27 Claims, 3 Drawing Sheets

(56) References Cited

U.S. PATENT DOCUMENTS

| | | |
|---|---|---|
| 2013/0179288 A1 | 7/2013 | Moses |
| 2015/0154453 A1* | 6/2015 | Wilf .................. G06T 7/564 |
| | | 382/103 |
| 2015/0279036 A1* | 10/2015 | Artan ................ G06V 20/593 |
| | | 382/159 |
| 2016/0174846 A9* | 6/2016 | Ferrantelli ............ A61B 5/107 |
| | | 600/407 |
| 2016/0275702 A1 | 9/2016 | Reynolds |
| 2018/0025251 A1* | 1/2018 | Welinder ............ G06F 40/166 |
| | | 382/199 |
| 2022/0084208 A1* | 3/2022 | Canepa ................ G06T 7/12 |

FOREIGN PATENT DOCUMENTS

| | | |
|---|---|---|
| CN | 106412413 A | 2/2017 |
| CN | 108737714 A | 11/2018 |
| CN | 108986159 A | 12/2018 |
| WO | WO 2020-141565 | 7/2020 |

OTHER PUBLICATIONS

Federico Tonin—ISizeYou Pitch @ WebSummit 2017, retrieved from Internet Apr. 18, 2019.

ISizeYou—human measure capture by 2 mobile pictures, Youtube, retrieved from Internet Apr. 18, 2019.

PCTIT2018000174—ISR & Written Opinion dated May 13, 2019.

Tang Youbao et al—Scene Text Detection via Edge Cue . . . , 14th Internat'l Conference on Frontiers in Handwriting Recognition, Oct. 23, 2016, pp. 156-161.

UKYS A Master Tailor in Your Phone, Youtube, retrieved from internet Apr. 18, 2019.

RU 2021120174/28—Office Action.

www.youtube.com/watch?v=s5S0GzTE0ns.

https://web.archive.org/web/20160331092259/https://pyimagesearch.com/2016/03/28/measuring-size-of-objects-in-an-image-with-opencv/.

* cited by examiner

ANTHROPOMETRIC DATA PORTABLE ACQUISITION DEVICE AND METHOD OF COLLECTING ANTHROPOMETRIC DATA

TECHNICAL FIELD

The present invention relates to an anthropometric data portable acquisition device and to a method of collecting anthropometric data.

BACKGROUND ART

As known, collection of anthropometric measures may be of interest in many fields, ranging from commerce to healthcare. For example, e-commerce systems dealing in garment may assist customers by providing suggestion on size selection based on personal data set including relevant body measures. Personal data may be fed to an automatic categorization system and size may be selected based on generally best fit criteria. This kind of service is not only convenient to the customers, but can dramatically reduce the rate of returned articles and is therefore beneficial also for the providers in terms of cost saving. As another example, in dietetics monitoring of body measures may help patient follow up and tailoring of treatments based on response.

It is apparent that advantages of use of anthropometric data would be greatly increased if data could be collected on the field directly by customers or patients using simple tools that do not require special training or skill to provide sufficiently accurate results. Anthropometric data are generally gathered through image acquisition and analysis and data collection may take advantage from the widespread diffusion of extremely versatile devices such as smartphones. Image capture tools have become so friendly that end users are nearly always expected to be able to frame and acquire images of sufficient quality to perform desired analysis procedures.

Rather, delegating the task of image acquisition to end users involves other issues, that need to be taken into consideration. On the one side, image processing, which is in itself demanding in terms of requirement of resources, must also cope with the fact that acquisition on the field normally suffers from poor conditions in terms of lighting, contrast against background, user posture and the like. Such conditions must be compensated by refining processing techniques, that normally result in increased computational load. In order to provide sufficient processing capacity, only basic capturing functions are devoted to end user devices image analysis, whereas main analysis procedures are carried out at remote sites reached through internet connections. On the other side, sharing images with remote sites leads to concerns regarding privacy and protection of personal data, because sensitive information is involved and law requirements are becoming increasingly strict. As a matter of fact, information relating to personal aspect is sent out of the control of the end user. Clearly, treatment of information is critical especially for medical applications.

DISCLOSURE OF INVENTION

It is thus an object of the present invention to provide an anthropometric data portable acquisition device and a method of collecting anthropometric data which allow to overcome or at least mitigate the limitations described.

According to the present invention, there are provided an anthropometric data portable acquisition device and a method of collecting anthropometric data as defined in claims 1 and 19, respectively.

BRIEF DESCRIPTION OF THE DRAWINGS

The present invention will now be described with reference to the accompanying drawings, which illustrate some non-limitative embodiments thereof, in which.

BEST MODE FOR CARRYING OUT THE INVENTION

Figure 1:
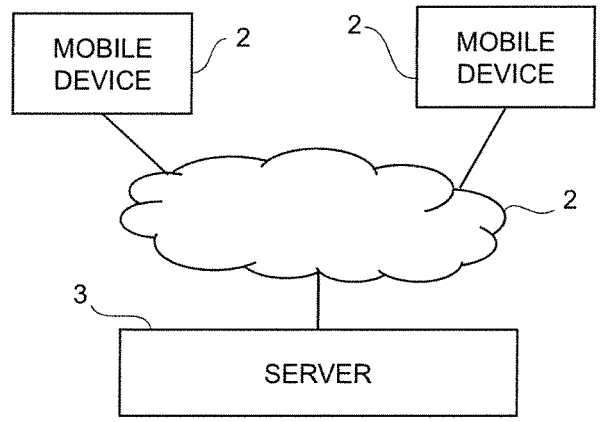
FIG. 1 is a simplified block diagram of an anthropometric data acquisition system.

In FIG. 1, an anthropometric data acquisition system is indicated as a whole by reference number 1 and comprises one or more anthropometric data portable acquisition devices 2 in accordance with an embodiment of the present invention and a server 3. The portable acquisition devices 2 and the server 3 are coupled in communication over a wide area network 4, e.g. the internet. The portable acquisition devices 2 are configured to capture images of individuals and to perform preliminary image processing steps, which are identified as frontend processing in what follows, whereby data sent to the server for completing extraction of relevant features (backend processing) are cleared of identity information.

Figure 2:
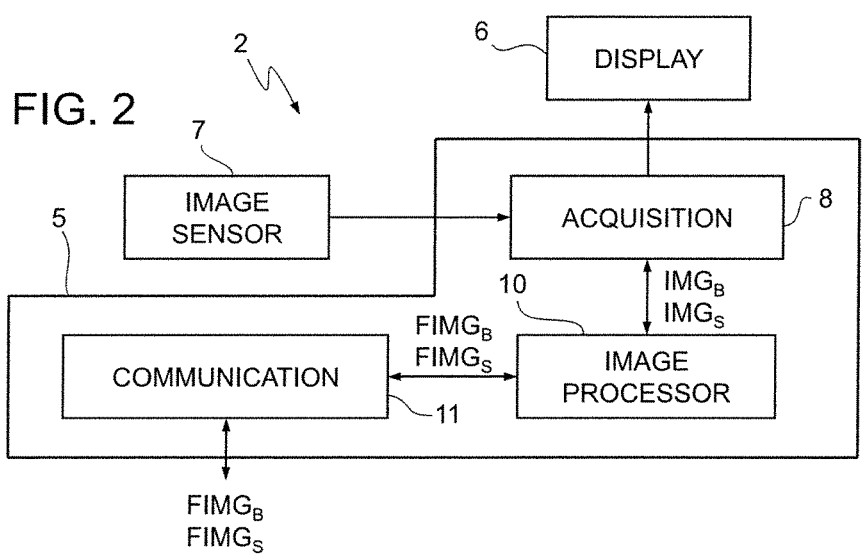
FIG. 2 is a more detailed block diagram of an anthropometric data portable acquisition devices included in the system of FIG. 2 and made in accordance with an embodiment of the present invention.

One exemplary portable acquisition device 2 is shown in FIG. 2 and will be referred to hereinafter, being it understood that the other portable acquisition devices 2 include the same components. The portable acquisition device 2 comprises a processing unit 5, a display 6 and an image sensor 7. In one embodiment, the portable acquisition device 2 may be integrated in a smartphone, a tablet computer or a laptop computer, advantageously, with integrated touchscreen as the display 6 and photo camera as the image sensor 7. The display 6 need not be a touchscreen, though.

The processing unit 5 is configured to implement an acquisition module 8, an image processor 10 and a communication module 11.

The acquisition module 8 activates the display 6 in live view mode during acquisition and captures images from the image sensor 7 in response to shooting commands sent by a user through an interface, which may include virtual or hard buttons (not shown). In live view mode, output signals of the image sensor 7 are continuously displayed on the display 6. The acquisition module 8 also sends information to the display 6 for visualization to the user, for the purpose of aiding correct acquisition.

Images captured by the acquisition module 8 are supplied to the image processor 10. The acquisition module 8 may be provided with some processing capability to perform basic actions such as white balance, brightness and contrast adjustment and conversion into compressed format. As an alternative, images in raw format are sent to the image processor 10, that carries out all desired processing steps.

The image processor 10 extracts a modified frontend images from received images. The extracted frontend images are sent to the server 3 through the communication module 11 for backend processing, that may therefore rely on higher level resources.

Figure 3A:
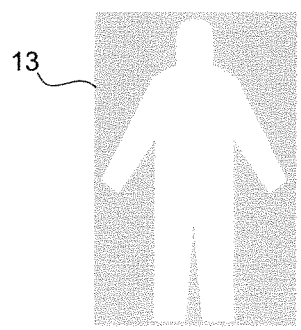
FIGS. 3a and 3b show acquisition masks used in the device of FIG. 2.

Image acquisition is assisted by the acquisition module 8, that provides information to lead the framed person to assume a posture in a range of admissible postures, while an operator takes a photo from the back and a photo on one side. Standard posture remarkably reduces computational load associated with image processing. More specifically (FIG. 3a), the acquisition module 8 starts acquisition of a back image by superimposing a back mask 13 to images shown on the display 6 in live view. The person can thus be guided to take a posture that fits into the back mask 13, which in one embodiment may require a standing position with legs apart and arms away from the torso. When the posture is correct, shooting commands are activated by the operator and a back image $IMG_B$ (FIG. 2) is captured by the acquisition module 8 and sent to the image processor 10. The back image $IMG_B$ may be temporarily stored in a memory unit incorporated either in the acquisition module 8 or in the image processor 10 or in a general purpose memory unit of the portable acquisition device 2.

Figure 3B:
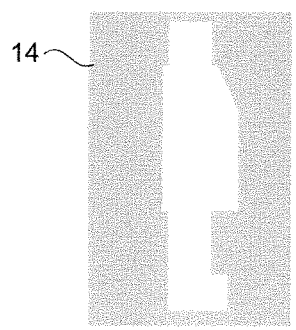

Once the back image $IMG_B$ has been captured and stored or sent to the image processor 10, the acquisition module 8 starts acquisition of a side image and superimposes a side mask 14 (FIG. 3b) to the images shown on the display 6 in live view. Again, the person is guided to take a posture that fits into the side mask 13, which requires a standing position with arms lying along the torso. When the posture is correct, the shooting command is activated by the operator and a side image $IMG_S$ is captured and sent to the image processor 10 or stored like the back image $IMG_B$.

Each of the back image $IMG_B$ and side image $IMG_S$ is then processed by the image processor 10 for edge detection and contour reconstruction substantially through the same step. For the sake of simplicity, reference will be made in what follows to the back image $IMG_B$ and it will be understood that the same applies also to the side image $IMG_S$, unless otherwise specified.

Figure 4:
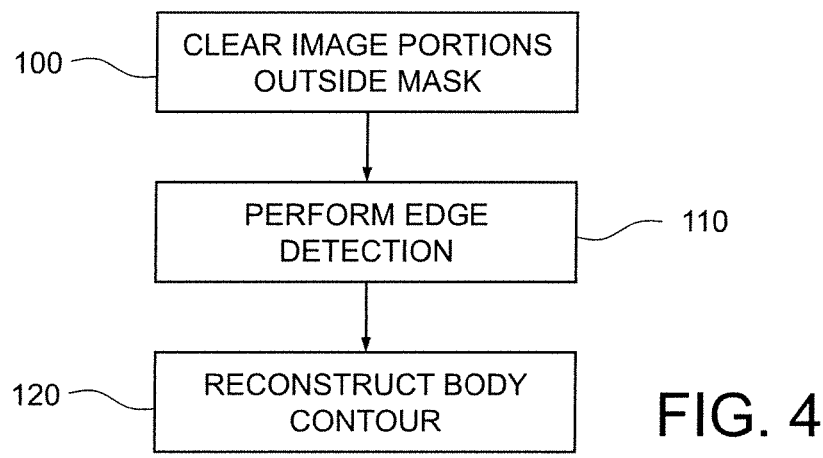
FIG. 4 is a simplified flow chart of steps of a method in accordance with an embodiment of the present invention.
Figure 5A:
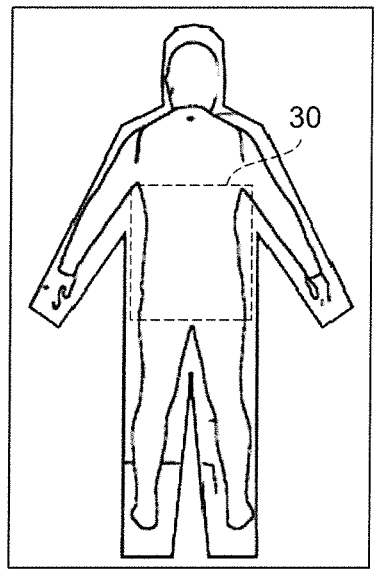
FIGS. 5a and 5b show images produced in the device of FIG. 2.
Figure 5B:
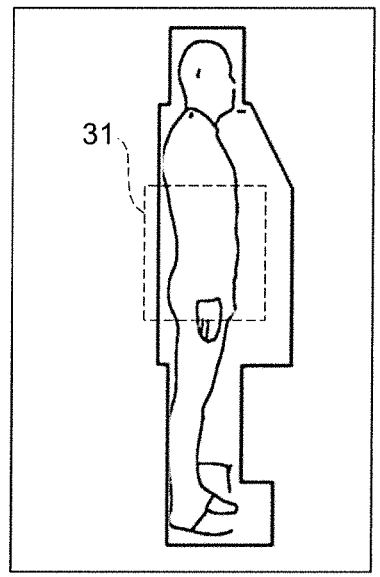

With reference to FIG. 4, after the side image $IMG_S$ has been received in a format suitable for processing, the image processor 10 clears portions of the side image $IMG_S$ corresponding to locations outside the back mask 13 (block 100), thereby reducing noise. Then, edge detection (block 110) and contour reconstruction (block 120) are performed. A frontend back image $FIMG_B$ including only body contour and possibly residual background noise is thus obtained and transferred to the server 3. Examples of a frontend back image $FIMG_B$ and of a frontend side image $FIMG_S$ are shown in FIGS. 5a and 5b, respectively. During the step of edge detection, body features which may possibly allow identification of the portrayed person are lost.

Edge detection may be carried out in several manners, but it is generally preferred that contour thickness is fairly constant, because it may be a critical parameter in subsequent backend processing. The image processor 10 may be configured to combine different edge detection procedures, in order to enhance performance.

In one embodiment (FIG. 6), the image processor 10 preliminary applies a noise reduction process to the back image $IMG_B$ to mitigate effects of high-frequency noise (block 112). The noise reduction process may be median filtering. It has been found that a size of the kernel of 15 pixel in the median filtering operator provides acceptable filtering performance without affecting precision of subsequent edge detection.

Then (block 114), contour of the back image $IMG_B$ is first extracted using a Canny edge detector process, which is described in Canny, J., "A Computational Approach To Edge Detection", IEEE Trans. Pattern Analysis and Machine Intelligence, 8(6):679-698, 1986. The Canny edge detector is very sensitive to image regions of low contrast which may be actually present. This aspect may be critical, because in image acquisition on the field it is not always possible to choose background providing adequate contrast. In order to avoid loss of information, contour of the back image $IMG_B$ is second extracted by the image processor 10 using another edge detector process (block 116) and the result of second contour extraction is combined with the result of the first contour extraction by the Canny edge detector in block 120 of FIG. 4. In one embodiment, the image processor 10 uses a structured random forest for edge detection, which is also referred to as structured edge detector. The structured edge detector is less sensitive to local regions of low contrast and is also more robust to noise than the Canny edge detector, thus curing weaknesses of the latter.

Figure 6:
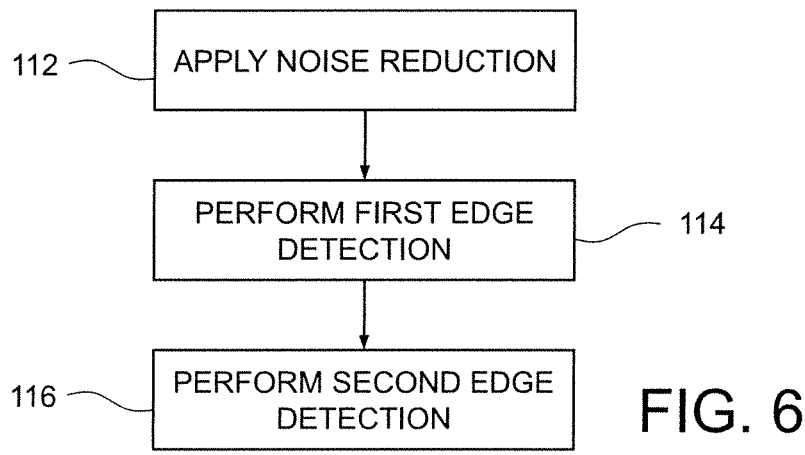
FIG. 6 is more detailed flow chart of part of the method steps of FIG. 4.
Figure 7:
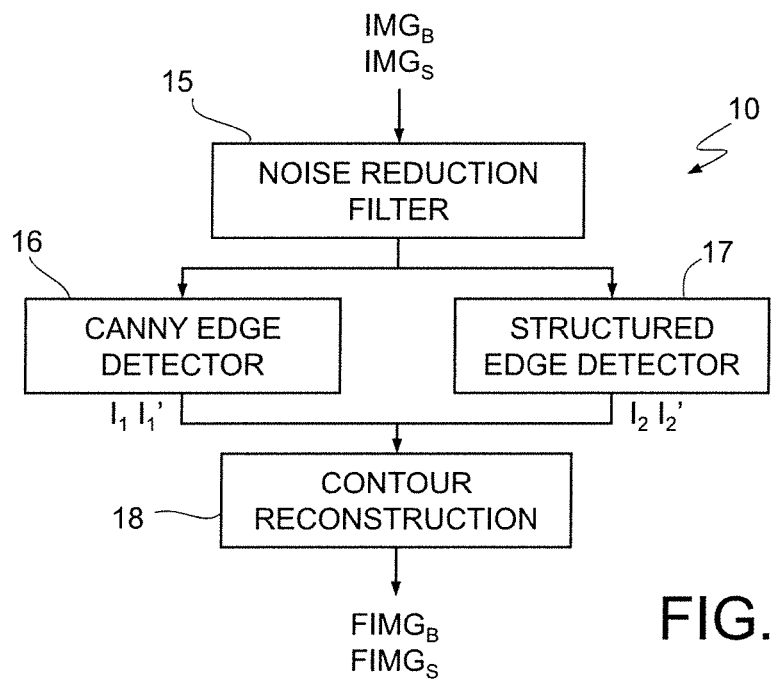
FIG. 7 is a more detailed block diagram of a component of the device of FIG. 2.

FIG. 7 shows an exemplary structure of the image detector 10 implementing the process of FIGS. 4 and 6. In the embodiment illustrated therein, the image detector 10 comprises a noise reduction filter 15, receiving the back image $IMG_B$ (and the side image $IMG_B$) and feeding in parallel the Canny edge detector and the structured edge detector, here indicated by 16 and 17, respectively. A first output $I_1$ of the Canny edge detector 16 and a second output $I_2$ of the structured edge detector 17 are then combined in a contour reconstruction module 18 which combines the results of the first and second contour extraction and supplies the frontend back image $FIMG_B$ and the frontend side image $FIMG_S$.

In one embodiment, the contour reconstruction module 18 combines the first output $I_1$ of the Canny edge detector 16 and the second output 12 of the structured edge detector 17 by addition, threshold and binarization. More precisely, brightness values of the first output $I_1$ and of the second output $I_2$ are added and the result is compared to a threshold τ, which may be selected as a fraction of the maximum response of the image sensor 7, e.g. 10%. A combined output defines the frontend back image $FIMG_B$ and is assigned a first logic value $L_1$ (e.g. high) if the sum of the first output $I_1$ and of the second output $I_2$ exceeds the threshold τ and a second logic value $L_2$ (e.g. low) otherwise:

$$FIMG_B = \begin{cases} L_1 & \text{if } I_1 + I_2 < \tau \\ L_2 & \text{if } I_1 + I_2 \leq \tau \end{cases}$$

Likewise, the frontend side image $FIMG_S$ is defined by:

$$FIMG_S = \begin{cases} L_1 & \text{if } I'_1 + I'_2 < \tau \\ L_2 & \text{if } I'_1 + I'_2 \leq \tau \end{cases}$$

When a side image $IMG_S$ is fed to the Canny edge detector 16 and to the structured edge detector 17 (the output of which are indicated by and $I_1'$ and $I_2'$, respectively).

In another embodiment, probabilistic models may be exploited, when sufficient computational capacity is available in the portable acquisition devices 2 to have acceptable response delay for users.

A label $l \in [L1, L2]^{IMGB}$ that minimizes an energy function $E(l)$ is assigned to each location in the image $IMG_B$ (or $IMG_S$). The energy function has a first component and a second component as follows:

$$E(l) = E_{UNARY}(l) + E_{PAIRWISE}(l)$$

The first component $E_{UNARY}(l)$ is a function which tends to assign to each pixel a value corresponding to the output of the edge detectors with relative probabilities $w_1$ and $w_2$, respectively $$E_{UNARY}(l) = w_1 \sum_x g(I_1(x), l) + w_2 \sum_x g(I_2(x), l)$$

where $$g(y, l) = \begin{cases} y & \text{if } l = 0 \\ 1 - y & \text{if } l = 1 \end{cases}$$

and $w_1$ and $w_2$ are weight parameters that determine to what extent the Canny edge detector 16 and the structured edge detector 17 will affect the result.

The second component $E_{PAIRWISE}(l)$ seeks to make neighboring pixels agree on a label, adding a constant penalty for disagreement, and is defined by:

$$E_{PAIRWISE}(l) = w_P \sum_{i,j \in PAIRS(l)} \Psi(i, j, l)$$

where $$\Psi(i, j, l) = \begin{cases} 0 & \text{if } l(i) = l(j) \\ 1 & \text{otherwise} \end{cases}$$

and PAIRS(I) includes all pairs of neighboring image points.

The weight parameter $w_P$ determines how strong the agreement between neighboring pixels should be. The optimal solution $$l^* = \arg_l \min E(l)$$

is approximated using the tree reweighted belief propagation algorithm.

In this manner, frontend back image $FIMG_B$ and frontend side image $FIMG_B$ are obtained from the back image $IMG_B$ and from the side image $IMG_S$, respectively, and are sent to the server 3 for backend processing. Frontend back image $FIMG_B$ and frontend side image $FIMG_S$ include complete and reliable body contour of the framed person and no personal identity information is transferred out of user's control. Personal information (e.g. face features) is in fact deleted during the edge detection and contour reconstruction steps without the need of any special dedicated processing and body contour is substantially anonymous. As already mentioned, exemplary frontend back image $FIMG_B$ and frontend side image $FIMG_S$ are shown in FIGS. 5a and 5b, respectively, where also the back mask 13 and the side mask 14 are depicted to intuitively suggest how image acquisition and the frontend processing are carried out. However the back mask 13 and the side mask 14 in themselves need not be part of the frontend back image $FIMG_B$ and frontend side image $FIMG_S$.

Figure 8:
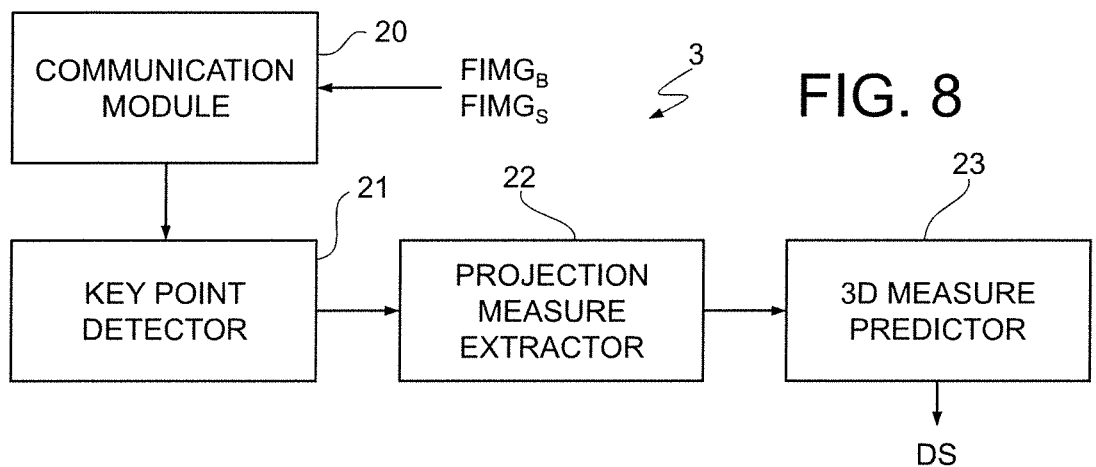
FIG. 8 is a more detailed block diagram of a component of the system of FIG. 1.

As illustrated in FIG. 8, the server 3 comprises a communication module 20, which receives the frontend back image $FIMG_B$ and the frontend side image $FIMG_S$, and components for backend processing, including a key point detector 21, a projection measure extractor 22 and a 3D measure predictor 23.

The key point detector 21 is configured to identify key points based on contour line thickness, since frontend images may contain noise, i.e. points that do not correspond to body contour. More precisely, a scan by horizontal lines (e.g. from left to right) is firstly carried out on the frontend back image $FIMG_B$ and pairs of subsequent lines of equal thickness are considered as left and right borders of a respective body portion. For example, if the horizontal scan reveals three pairs of subsequent lines of equal thickness, three body portions are identified, which may be left and right border of the left arm for the first pair, left and right border of the torso for the second pair and left and right border of the right arm for the third pair.

By the scan of the frontend back image $FIMG_B$, the key point detector 21 identifies head tip, heels, armpits and crotch. Then head tip and heels are identified by a second scan of the frontend side image $FIMG_S$.

Figures 9, 10:
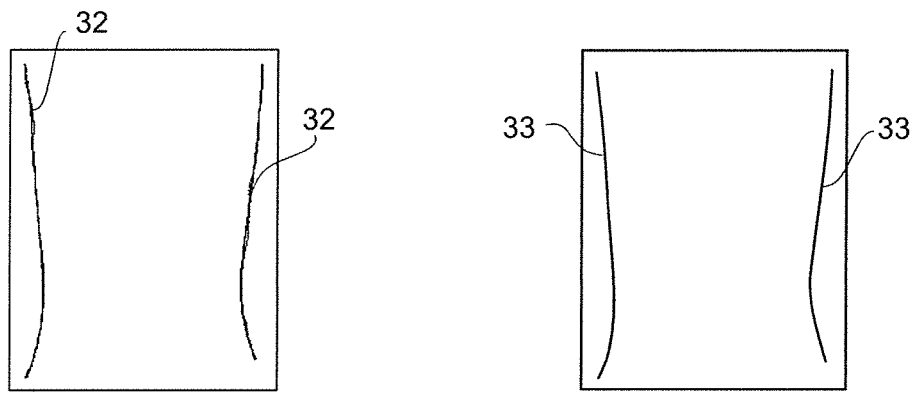
FIGS. 9 and 10 show images produced in the component of FIG. 8.

The projection measure extractor 22 is configured to identify the contour points belonging to the torso, based on armpits and crotch positions as determined by key point detector 21 (windows 30, 31 in FIGS. 5a and 5b). In order to reduce the unevenness which may be introduced by the previous processing steps, the projection measure extractor 22 approximates torso lines (32, FIG. 9) by polynomial functions (33, FIG. 10). Given the nature of the torso side, and in particular the expected number of maxima and minima, a fourth degree polynomial is sufficient and at the same time not too complex for the fitting. Also possible missing parts of the contour may be estimated by the projection measure extractor 22 by use of polynomial functions, such as Bezier polynomials.

Then, the projection measure extractor 22 takes measures of the projections of main body dimensions on the image plane or on plane perpendicular thereto. The main body dimensions may include, for example, neck, chest, waist, hips, inseam. Measures of chest, waist and hips may be taken at fixed and predetermined vertical coordinates (Y-coordinate), e.g. as follows:

$$Y\text{hips} = Y\text{crotch} + \tfrac{4}{33}CA$$

$$Y\text{waist} = Y\text{crotch} + \tfrac{16}{33}CA$$

$$Y\text{chest} = Y\text{crotch} + \tfrac{28}{33}CA$$

where CA is the distance between crotch and armpits.

In another embodiment, Ychest is taken at the widest part of upper third of the torso as derived from the frontend side image $FIMG_S$; Ywaist is taken at the smallest part of the central third of the torso as derived from the frontend back image $FIMG_B$; and Yhips is taken at the widest part of the lower third of the torso as derived from the frontend side image $FIMG_S$. Other measures may be added according to design preferences.

The 3D measure predictor 23 is configured to provide estimates or predictions of actual body measures starting from the measures o projection measure provided by the projection measure extractor 22. To this end, 3D measure predictor 23 may use either a simplified model such as a linear model or a probabilistic model, e.g. a Gaussian Process model. While linear models are more simple and yield widely satisfactory results in line with industry standards in terms of errors, probabilistic models allow to complement the prediction for each measurement with a measure of its uncertainty. Uncertainty can be used to predict estimation errors and trigger appropriate corrective actions to avoid providing the users with wrong output and predictions affected by very high variance.

Gaussian Processes can effectively deal with noise and this is important in order to allow collection on data form images taken on the filed by users without specific training.

Typically, Gaussian Processes may indicated as $$f(x) \sim GP(m(x), k(x, x'))$$

where $m(x) = E[f(x)]$ is the expected value and $k(x, x') = E[(f(x) - m(x))(f(x') - m(x'))]$ is the covariance function.

The function modelled by the Gaussian Process is the one predicting 3D body measurements starting from the length of their planar projections as provided by the projection measure extractor 22. Covariance function allows us to obtain a non-linear mapping and give flexibility in the specific form of non-linearity which is allowed. Due to their mathematical properties, covariance functions can be combined together to obtain new ones showing the desired characteristics. In the one embodiment, the sum of 3 different covariance functions:

a constant covariance function used to model non-zero means for the different variables $$k_c = \sigma_0^2$$

a linear covariance function $$k_l(x, x') = \sum_{d=1}^{D} \sigma_d^2 x_d x'_d$$

where x and x' represent two generic points and index d indexes the D dimensions of the input space a squared exponential covariance function which allows to obtain non-linear smooth mappings $$k_{SE}(x, x') = \exp\left(-\frac{|x - x'|^2}{2h^2}\right)$$

where x and x' represent two generic points and h is a characteristic length-scale working as a scaling factor.

On its output, the 3D measure predictor 23 provides a data set DS which includes estimates of the actual (3D) size of relevant parts of the body of the framed person.

It is finally apparent that changes and variations may be made to the device and method described and illustrated without departing from the scope of protection of the accompanying claims.

The invention claimed is:

1. An anthropometric data portable acquisition device comprising an image sensor and a processing unit, the processing unit comprising:
    an acquisition module, configured to receive first images of a person from the image sensor;
    an image processor, configured to provide second images from respective first images by applying edge detection procedure;
    wherein the image processor comprises a first edge detector, configured to perform a first contour extraction, a second edge detector, configured to perform a second contour extraction, and wherein the first images are fed in parallel to the first edge detector and to the second edge detector;
    a contour reconstruction module configured to combine a first output of the first edge detector and the second output of the second edge detector by addition, threshold and binarization;
    wherein the contour reconstruction module is further configured to compare a sum of brightness values of the first output and of the second output to a threshold and to define the second images by assigning a first logic value if the sum of the first output and of the second output exceeds the threshold and a second logic value otherwise; and
    a communication module, configured to send out the second images.

2. The device according to claim 1, comprising a display operable in live view mode, whereby output signals of the image sensor are continuously displayed on the display, the acquisition module being further configured to superimpose visual information to live view images on the display for guiding the person to assume a posture in an range of acceptable postures.

3. The device according to claim 2, wherein the visual information include a first mask and a second mask and the range of acceptable postures includes first postures of the person that fit into the first mask and second postures of the person that fit into the second mask, the first mask requiring the person to take a standing position with legs apart and arms away from the torso and the second mask requiring the person to take a standing position with arms lying along the torso.

4. The device according to claim 3, wherein the image processor is configured to clear portions of the first images corresponding to locations outside one of the first mask and the second mask.

5. The device according to claim 1, wherein the image processor comprises a contour reconstruction module configured to combine results of the first contour extraction performed by the first edge detector and of the second contour extraction performed by the second edge detector.

6. The device according to claim 1, wherein the first edge detector is a Canny edge detector.

7. The device according to claim 1, wherein the second edge detector is a structured edge detector.

8. An anthropometric data acquisition system comprising a server and at least one anthropometric data portable acquisition device according to claim 1 coupled in communication to the server.

9. The system according to claim 8, wherein the server comprises a communication module, configured to receive the second images from the anthropometric data portable acquisition device, a key point detector (21) configured to identify key points in the second images and respective positions thereof based on contour line thickness, the key points including head tip, heels, armpits, crotch.

10. The system according to claim 9, wherein the server comprises a projection measure extractor, configured to identify body contour points belonging to a torso, based on armpits and crotch positions as determined by key point detector.

11. The system according to claim 10, wherein the projection measure extractor is configure to approximate torso lines by polynomial functions.

12. The system according to claim 10, wherein the projection measure extractor is further configured to take measures of projections of selected main body dimensions on an image plane or on a plane perpendicular thereto.

13. The system according to claim 10, wherein the projection measure extractor is further configured to take measures of chest, waist and hips at fixed and predetermined vertical coordinates or to take measures of chest at a widest part of an upper third of the torso, measures of waist at a smallest part of a central third of the torso and measures of hips at a widest part of the lower third of the torso.

14. The system according to claim 9, wherein the server comprises a 3D measure predictor configured to provide estimates or predictions of actual body measures from measures provided by the projection measure extractor using a linear model or a probabilistic model.

15. A method of collecting anthropometric data comprising:
    capturing first images of a person using a portable device equipped with an image sensor, an image processor and a display operable in a live view mode;
    locally first processing the first images at the portable device, thereby providing second images from respective first images; and
    sending out the second images to a remote server;
    wherein first processing the first images comprises:
    applying an edge detection procedure, performing a first contour extraction from the first images by a first edge detector, performing a second contour extraction from the first images by a second edge detector, and combining results of the first contour extraction performed by the first edge detector and of the second contour extraction performed by the second edge detector;
    wherein combining results comprises:
    comparing a sum of brightness values of the first output and of the second output to a threshold; and
    assigning a first logic value if the sum of the first output and of the second output exceeds the threshold and a second logic value otherwise, thereby defining the second images.

16. The method according to claim 15, wherein capturing first images comprises guiding the person to assume a posture in an range of acceptable postures, by superimposing visual information to live view images on the display.

17. The method according to claim 16, wherein the visual information include a first mask and a second mask and the range of acceptable postures includes first postures of the person that fit into the first mask and second postures of the person that fit into the second mask, the first mask requiring the person to take a standing position with legs apart and arms away from the torso and the second mask requiring the person to take a standing position with arms lying along the torso.

18. The method according to claim 17, comprising clearing portions of the first images corresponding to locations outside one of the first mask and the second mask.

19. The method according to claim 15, wherein combining results comprises combining a first output of the first edge detector and the second output of the second edge detector by addition, threshold and binarization.

20. The method according to claim 15, comprising remotely second processing the second images at the remote server.

21. An anthropometric data portable acquisition device comprising an image sensor and a processing unit, the processing unit comprising:
    an acquisition module, configured to receive first images of a person from the image sensor;
    an image processor, configured to provide second images from respective first images by applying edge detection procedure;
    wherein the image processor comprises a first edge detector, configured to perform a first contour extraction, a second edge detector, configured to perform a second contour extraction, and wherein the first images are fed in parallel to the first edge detector and to the second edge detector;
    wherein the contour reconstruction module is further configured to assign a label that minimizes an energy function to each location in the first images and wherein the energy function has a first component $E_{UNARY}(l)$ and a second component $E_{PAIRWISE}(l)$ and is defined as follows:

$$E(l) = E_{UNARY}(l) + E_{PAIRWISE}(l)$$

$$E_{UNARY}(l) = w_1 \sum_x g(I_2(x), l) + w_2 \sum_x g(I_2(x), l)$$

where $$g(y, l) = \begin{cases} y & \text{if } l = 0 \\ 1 - y & \text{if } l = 1 \end{cases}$$

and $w_1$ and $w_2$ are weight parameters $$E_{PAIRWISE}(l) = w_P \sum_{i,j \in PAIRS(l)} \Psi(i, j, l)$$

where $$\Psi(i, j, l) = \begin{cases} 0 & \text{if } l(i) = l(j) \\ 1 & \text{otherwise} \end{cases}$$

And $w_P$ is a weight parameter; and
    a communication module configured to send out the second images.

22. The device according to claim 21, comprising a display operable in live view mode, whereby output signals of the image sensor are continuously displayed on the display, the acquisition module being further configured to superimpose visual information to live view images on the display for guiding the person to assume a posture in an range of acceptable postures.

23. The device according to claim 22, wherein the visual information include a first mask and a second mask and the range of acceptable postures includes first postures of the person that fit into the first mask and second postures of the person that fit into the second mask, the first mask requiring the person to take a standing position with legs apart and arms away from the torso and the second mask requiring the person to take a standing position with arms lying along the torso.

24. The device according to claim 23, wherein the image processor is configured to clear portions of the first images corresponding to locations outside one of the first mask and the second mask.

25. The device according to claim 21, wherein the image processor comprises a contour reconstruction module configured to combine results of the first contour extraction performed by the first edge detector and of the second contour extraction performed by the second edge detector.

26. The device according to claim 21, wherein the first edge detector is a Canny edge detector.

27. The device according to claim 21, wherein the second edge detector is a structured edge detector.

* * * * *